(12) United States Patent
Bunker et al.

(10) Patent No.: US 10,284,765 B1
(45) Date of Patent: May 7, 2019

(54) SYSTEM AND METHOD FOR WIRELESS POWER TRANSFER OF AN INFRARED ILLUMINATOR

(71) Applicant: Nortek Security & Control LLC, Carlsbad, CA (US)

(72) Inventors: Philip Alan Bunker, Vista, CA (US); Joshua Luis Tristan, Oceanside, CA (US); Bruce James Ehlers, Encinitas, CA (US)

(73) Assignee: Nortek Security & Control LLC, Carlsbad, CA (US)

( * ) Notice: Subject to any disclaimer, the term of this patent is extended or adjusted under 35 U.S.C. 154(b) by 0 days.

(21) Appl. No.: 15/827,811

(22) Filed: Nov. 30, 2017

(51) Int. Cl.
*H04N 5/232* (2006.01)
*H02J 7/02* (2016.01)
*H04N 5/225* (2006.01)
*H04N 5/38* (2006.01)

(52) U.S. Cl.
CPC ........ *H04N 5/23206* (2013.01); *H02J 7/025* (2013.01); *H04N 5/2256* (2013.01); *H04N 5/23241* (2013.01); *H04N 5/38* (2013.01)

(58) Field of Classification Search
CPC ................................................ H04N 5/23241
See application file for complete search history.

(56) References Cited

U.S. PATENT DOCUMENTS

| 2013/0328407 A1* | 12/2013 | Shimura | H02J 7/025 307/104 |
| 2015/0249343 A1* | 9/2015 | Makwinski | H02J 5/005 307/104 |
| 2016/0190859 A1* | 6/2016 | Blum | H02J 7/025 348/372 |

OTHER PUBLICATIONS

Foscam User Manual Model: FI9831P; 2015; Foscam; all (Year: 2015).*
Jody; "Window-Mount Security Cameras vs Outdoor Home SecurityCameras"; http://24-7-home-security.com/indoor-cameras-pointed-outside-vs-outdoor-home-security-cameras/; Jan. 21, 2017; all (Year: 2017).*
Blue Iris; "Blue Iris Help"; http://www.warf.com/download/5982_1816_Blue-Iris-Chm-Help-File-03-30-2013.v3.pdf; Dec. 25, 2011; all (Year: 2011).*

* cited by examiner

*Primary Examiner* — Gary C Vieaux
(74) *Attorney, Agent, or Firm* — Schwegman Lundberg & Woessner, P.A.

(57) ABSTRACT

A camera system comprising a camera, a wireless power transmitter, a wireless power receiver, and an infrared illuminator. The camera and wireless power transmitter are powered by a power source. The wireless power transmitter wirelessly transmits power to the wireless power transmitter to power the infrared illuminator. The infrared illuminator generates infrared light.

20 Claims, 7 Drawing Sheets

SYSTEM AND METHOD FOR WIRELESS POWER TRANSFER OF AN INFRARED ILLUMINATOR

BACKGROUND

Indoor security cameras can be used to monitor outdoor activities by placing the camera against a glass window. However, some cameras include an IR illuminator to enable the camera to operate and detect images in the dark. The IR illuminator outputs infrared light towards the glass window. The glass window reflects the infrared light back to the camera causing the infrared light to blind the camera. Therefore, when the IR illuminator is mounted inside and on the same side as the camera, reflections from the glass blind the camera.

BRIEF DESCRIPTION OF THE DRAWINGS

The present embodiments are illustrated by way of example, and not by way of limitation, in the figures of the accompanying drawings in which.

DETAILED DESCRIPTION

Although the present disclosure has been described with reference to example embodiments, various modifications and changes may be made to these embodiments without departing from the broader spirit and scope of the disclosure. Accordingly, the specification and drawings are to be regarded in an illustrative rather than a restrictive sense.

The present disclosure relates generally to a wireless power transfer system, and, in a specific example embodiment, a wireless power transfer system using magnetic induction to power a camera through a medium such as glass.

The present disclosure describes a wireless power transfer device that allows for energy to be conveyed through a dielectric medium such as a glass window for powering a part of a security device outdoors without external wiring. The security device may include an infrared (IR) camera (or any other type of image capture device) and an IR illuminator. The IR illuminator is placed outdoor (outside the glass window) while the IR camera is placed indoors. The IR camera wirelessly transfers electrical power through the glass window to power the IR illuminator. By mounting the IR illuminator on the opposite side of the window glass from the IR camera, the IR light is not reflected back to the IR camera. The IR illuminator would not require any external wires to power the IR illuminator.

In various embodiments, a system comprises a camera, a wireless power transmitter, a wireless power receiver, and an IR illuminator. A power source powers the camera and is also connected to the wireless power transmitter. The camera controls whether to power the wireless power transmitter. When powered, the wireless power transmitter wirelessly transmits electrical power from the power source to the wireless power receiver. The wireless power receiver powers the infrared illuminator to generate infrared light.

In another example embodiment, the camera further comprises a processor, a communication interface, and a wireless power controller. The processor includes an infrared mode module. The communication interface communicates with a server. The wireless power controller controls the wireless power transmitter.

In another example embodiment, the infrared mode module receives a communication from the server via the communication interface. The communication indicating an infrared mode setting of the camera and the infrared mode setting identifies a night time setting. The wireless power controller enables the wireless power transmitter to wirelessly transmit power to the wireless power receiver in response to identifying the night time setting.

In another example embodiment, the camera further comprises a switch coupled between the wireless power transmitter and the power source. The switch is controlled by the wireless power controller. The wireless power controller enables the wireless power transmitter by turning on the switch to connect the wireless power transmitter to the power source.

In another example embodiment, the infrared mode module receives a communication from the server via the communication interface. The communication indicates an infrared mode setting of the camera and the infrared mode setting identifies a day time setting. The wireless power controller disables the wireless power transmitter in response to identifying the day time setting.

In another example embodiment, the camera further comprises a switch coupled between the wireless power transmitter and the power source. The switch is controlled by the wireless power controller. The wireless power controller disables the wireless power transmitter by turning off the switch that disconnects the wireless power transmitter to the power source.

In another example embodiment, the infrared illuminator further comprises a battery and a wireless communication interface. The battery is coupled to the wireless power receiver. The wireless communication interface receives a communication from the camera. The communication indicates an infrared mode setting of the camera. The infrared illuminator generates the infrared light in response to identifying the infrared mode setting.

In another example embodiment, the infrared illuminator further comprises a battery and a hardware processor. The battery is coupled to the wireless power receiver. The hardware processor comprises an infrared mode module that indicates an infrared mode setting. The infrared illuminator generates the infrared light based on the infrared mode setting.

In another example embodiment, the camera and the wireless power transmitter are both disposed adjacent to a first side of a glass medium. The wireless power receiver and the infrared illuminator are both disposed on second side opposite of the glass medium. The first side is opposite to the second side.

Figure 1:
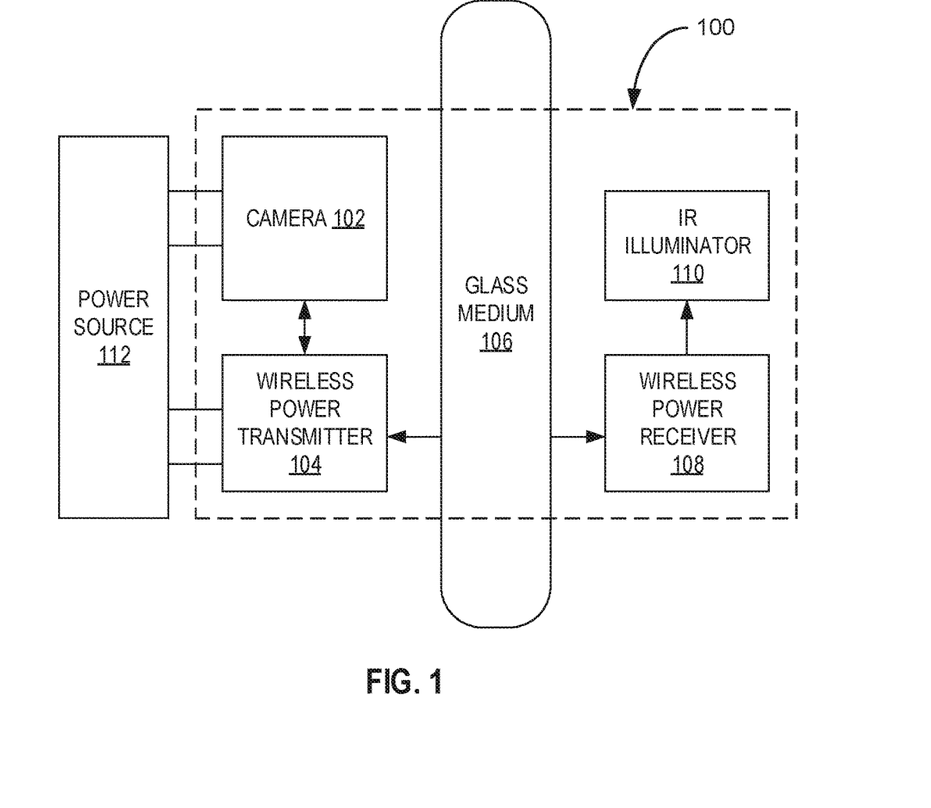
FIG. 1 is a block diagram illustrating an example embodiment of a system for wireless power transfer of an infrared illuminator of a camera.

FIG. 1 is a block diagram illustrating an example embodiment of a system 100 for wireless power transfer of an infrared (IR) illuminator of a camera. A power source 112 transmits electrical power to both the camera 102 and the wireless power transmitter 104. The power source 112 includes, for example, a DC power source (e.g., battery) or an AC power source (e.g., electrical outlet). In another example embodiment, the power source 112 is only connected to the camera 102. The camera 102 transmits electrical power to the wireless power transmitter 104.

The camera 102 includes an infrared camera capable of detecting infrared light. The infrared camera includes an infrared sensor and a signal processor (not shown). The infrared sensor can detect infrared waves reflected from an object on the opposite side of glass medium 106. The signal processor processes the infrared waves into video/image signals. The camera 102 is placed and pointed against a window that includes the glass medium 106.

In one example embodiment, the wireless power transmitter 104 is part of the camera 102. In another example embodiment, the wireless power transmitter 104 is a component separate from the camera 102 and is mounted against the glass medium 106. The wireless power transmitter 104 includes, for example, a primary circuit (not shown) for wirelessly transmitting electrical power. The primary circuit receives electrical power from the power source 112 or from the camera 102 or a combination of both the power 112 and the camera 102. In one example embodiment, the camera 102 enables or disables an operation of the wireless power transmitter 104 by connecting or disconnecting the power source 112 to the primary circuit, for example, via a switch (not shown). In another example embodiment, the wireless power transmitter 104 is disposed adjacent to the camera 102 against a first side of the glass medium 106.

A wireless power receiver 108 is disposed against a second side (opposite to the first side) of the glass medium 106 and adjacent to the wireless power transmitter 104. The wireless power receiver 108 includes, for example, a secondary circuit (not shown) for wirelessly receiving electrical power from the wireless power transmitter 104. In one example embodiment, the wireless power receiver 108 is connected to the IR illuminator 110 and electrically powers the IR illuminator 110. In another example embodiment, the wireless power receiver 108 is connected to a rechargeable battery (not shown) and electrically charges the rechargeable battery. The rechargeable battery electrically powers the IR illuminator 110. In another example embodiment, the IR illuminator 110 is enabled or disabled in response to the camera 102. For example, the camera 102 sends a wireless signal to a transceiver (not shown) in the IR illuminator 110. The transceiver turns on or off the IR illuminator 110 in response to the received wireless signal.

In another example embodiment, the IR illuminator 110 includes an infrared light emitting light source disposed in a concentric pattern with an opening in a center (e.g., donut pattern). The IR illuminator 110 is placed against the glass medium 106 with the camera 102 aimed through the opening.

Figure 2:
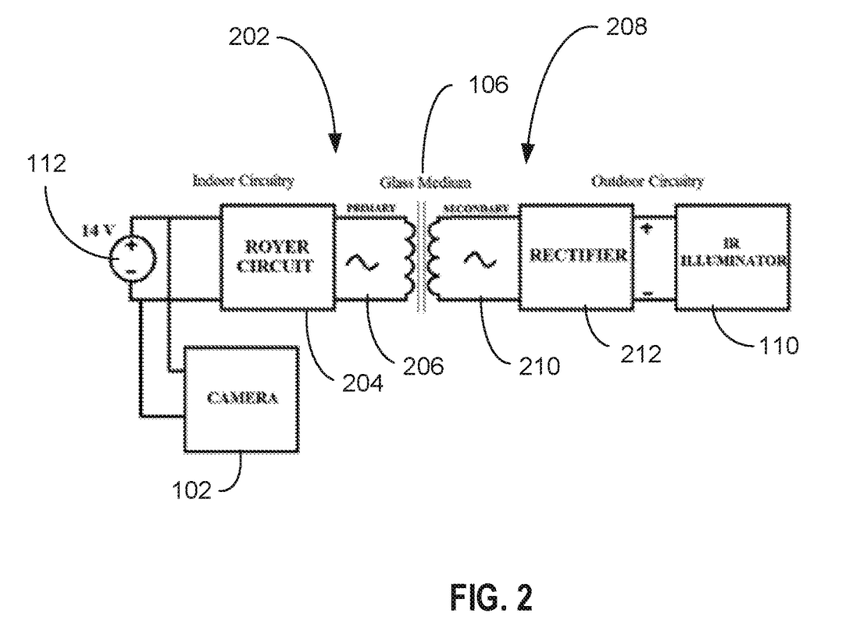
FIG. 2 is a wiring diagram illustrating an example embodiment of the system of FIG. 1.

FIG. 2 is a wiring diagram illustrating an example embodiment of the system of FIG. 1. The power source 112 powers both the camera 102 and the primary circuit 202. The primary circuit 202 includes, for example, a Royer circuit 204 and an emitter coil 206. The glass medium 106 separates the primary circuit 202 from a secondary circuit 208. The secondary circuit 208 includes, for example, a receiver coil 210 and a rectifier 212. The emitter coil 206 is placed adjacent to the receiver coil 210. The emitter coil 206 wirelessly transmits electrical power to the receiver coil 210. The secondary circuit 208 powers the IR illuminator 110. Those of ordinary skills in the art will recognize that other types of circuit may be used to wireless transfer electrical power.

Figure 3:
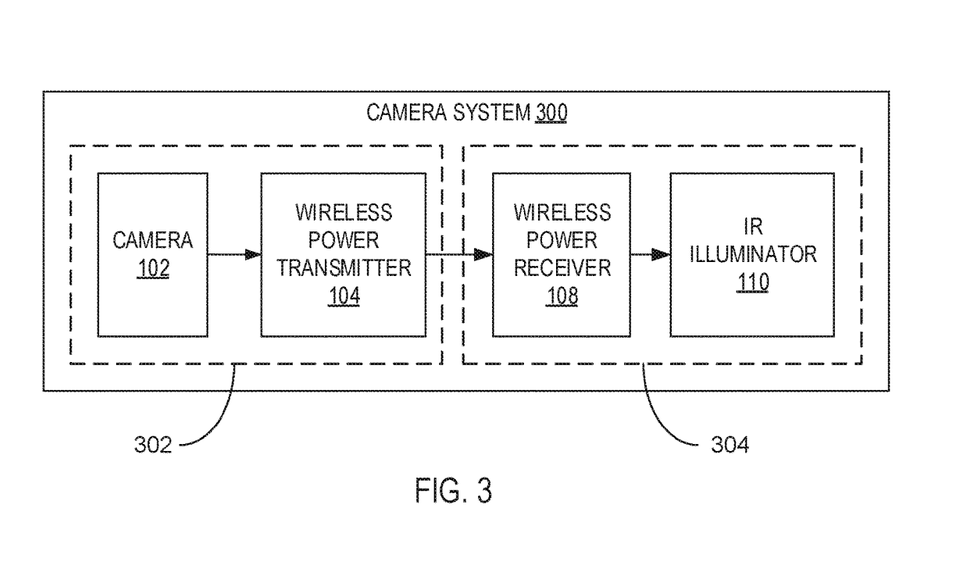
FIG. 3 is a block diagram illustrating an example embodiment of a camera system.

FIG. 3 is a block diagram illustrating an example embodiment of a camera system 300. The camera system 300 includes two main components 302 and 304. The first component 302 includes two parts: the camera 102 connected by an electrical wire to the wireless power transmitter 104. In one example embodiment, the wireless power transmitter 104 is part of the body of the camera 102. In another example environment, the wireless power transmitter 104 is separate from the body of the camera 102. The wireless power transmitter 104 can be mounted to a side of a window.

The second component 304 includes two parts: a wireless power receiver 108 connected by an electrical wire to the IR illuminator 110. The wireless power receiver 108 can be mounted to the side of the window that is opposite to the wireless power transmitter 104. In one example embodiment, the IR illuminator 110 includes a rechargeable battery (now shown). The wireless power receiver 108 is connected to the rechargeable battery. In another example embodiment, the IR illuminator 110 is directly connected to the wireless power receiver 108.

Figure 4:
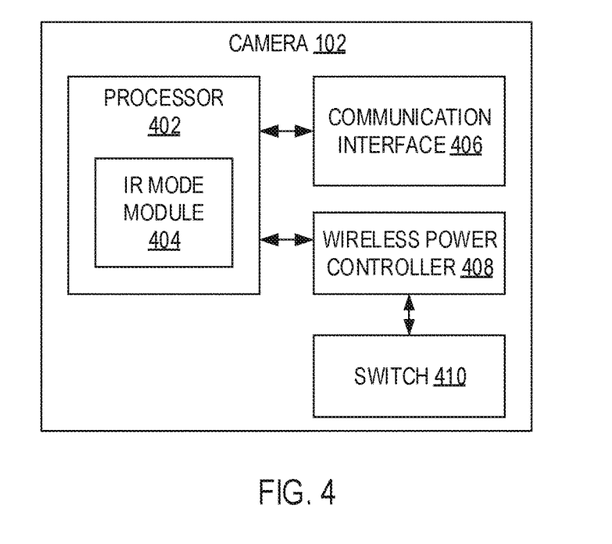
FIG. 4 is a block diagram illustrating an example embodiment of a camera of the camera system of FIG. 3.

FIG. 4 is a block diagram illustrating an example embodiment of a camera 102 of the camera system 300 of FIG. 3. The camera 102 includes a processor 402, a communication interface 406, a wireless power controller 408, and a switch 410. The processor 402 is configured to execute instructions from an IR mode module 404. The IR mode module 404 determines whether to enable or disable the IR illuminator 110. The communication interface 406 receives communication from a server or from another computing device. The communication includes, for example, settings or parameters for enabling or disabling the IR illuminator 110. Examples of settings or parameters include instructions to turn on the IR illuminator 110 between sunset time and sunrise time, turning on the IR illuminator 110 in response to motion detection (based on a motion detector coupled to the camera 102), turning on or off the IR illuminator 110 at preset times.

In one example embodiment, the processor 402 receives the settings or parameters via the communication interface 406. The communication interface 406 includes, for example, a wireless transceiver.

The wireless power controller 408 receives instructions from the IR mode module 404 and turns the switch 410 on or off in response to the instructions. The instructions are based on the settings/parameters received from the communication interface 406. The switch 410 is connected between the power source 112 and the wireless power transmitter 104. Therefore, when the switch 410 is turned off, the power source 112 is disconnected from the wireless power transmitter 104. When the switch 410 is turned on, the power source 112 is connected to the wireless power transmitter 104.

In another example embodiment, the switch 410 is connected between the camera 102 and the wireless power transmitter 104. The camera 102 powers the wireless power transmitter 104. Therefore, when the switch 410 is turned off, the camera 102 is disconnected from the wireless power transmitter 104. When the switch 410 is turned on, the camera 102 is connected to the wireless power transmitter 104.

Figure 5:
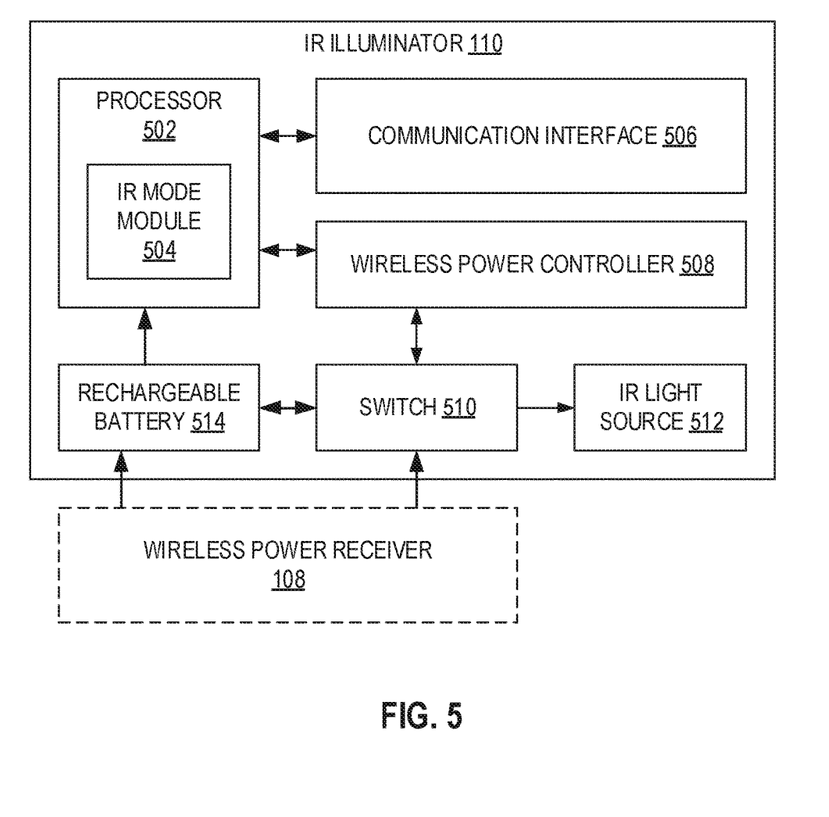
FIG. 5 is a block diagram illustrating an example embodiment of an IR illuminator of the camera system of FIG. 3.

FIG. 5 is a block diagram illustrating an example embodiment of an IR illuminator of the camera system of FIG. 3. The IR illuminator 110 includes a processor 502, a communication interface 506, a wireless power controller 508, a switch 510, an IR light source 512, and a rechargeable battery 514. The processor 502 is configured to execute instructions from an IR mode module 504. The IR mode module 504 determines whether to turn on or off the IR light source 512. The communication interface 506 receives communication from the camera 102, a server, or from another computing device. In one example embodiment, the communication includes a control command to turn on or off the IR light source 512. In another example embodiment, the communication includes settings or parameters for turning on or off the IR light source 512. Examples of settings or parameters include instructions to turn on the IR light source 512 at preset times or based on other conditions (e.g., motion detection).

In one example embodiment, the processor 502 receives the settings or parameters via the communication interface 506 (e.g., from the server or the camera 102). The communication interface 506 includes, for example, a wireless transceiver.

The wireless power controller 508 receives instructions from the IR mode module 504 and controls the switch 510 on or off in response to the instructions. The instructions are based on the settings/parameters received from the communication interface 506. The switch 510 turns on or off the IR light source 512 based on the instructions from the IR mode module 504.

In one example embodiment, the switch 510 is connected between the wireless power receiver 108 and the IR light source 512. Therefore, when the switch 510 is turned off, the wireless power receiver 108 is disconnected from the IR light source 512 to turn off the IR light source 512. When the switch 510 is turned on, the wireless power receiver 108 is connected to the IR light source 512 to turn on the IR light source 512.

In another example embodiment, the switch 510 is connected between the rechargeable battery 514 and the IR light source 512. The rechargeable battery 514 receives power from the wireless power receiver 108. The rechargeable battery 514 can be used to power the IR light source 512. Therefore, when the switch 510 is turned off, the rechargeable battery 514 is disconnected from the IR light source 512 to turn off the IR light source 512. When the switch 510 is turned on, the rechargeable battery 514 is connected to the IR light source 512 to turn on the IR light source 512. In another example embodiment, the wireless power receiver 108 is connected to the rechargeable battery 514 or the switch 510.

Figure 6:
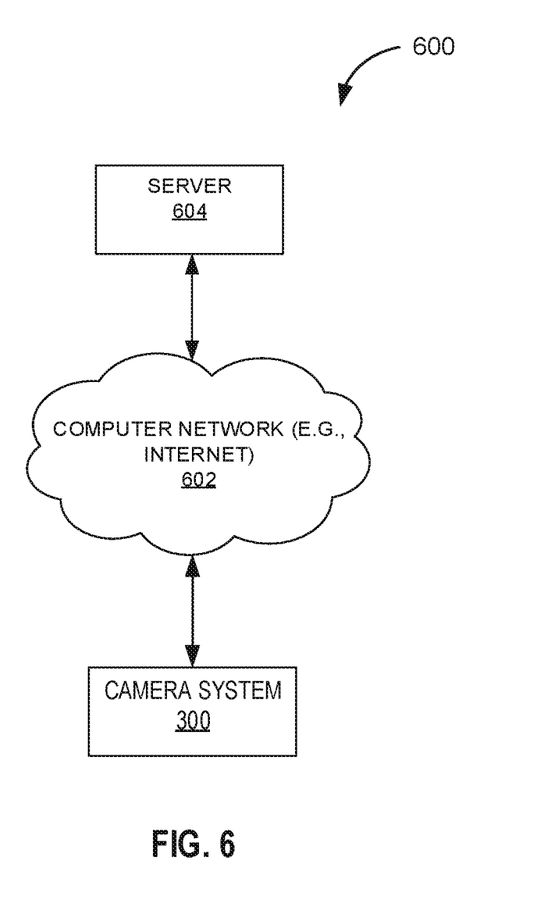
FIG. 6 is a block diagram illustrating an example embodiment of a network system for implementing the camera system.

FIG. 6 is a block diagram illustrating an example embodiment of a network system 600 for implementing the camera system 300. The camera system 300 communicates with a server 604 via a computer network 602. The camera system 300 retrieves settings from the server 604. The settings include parameters for enabling or disabling IR illuminator 110 of the camera system 300. Examples of settings or parameters include instructions to turn on or off the IR illuminator 110 at preset times. In one example embodiment, the camera 102 of the camera system 300 retrieves the settings or receives IR control commands from the server 604. In another example embodiment, the IR illuminator 110 retrieves the settings or receives IR control commands from the server 604.

Figure 7:
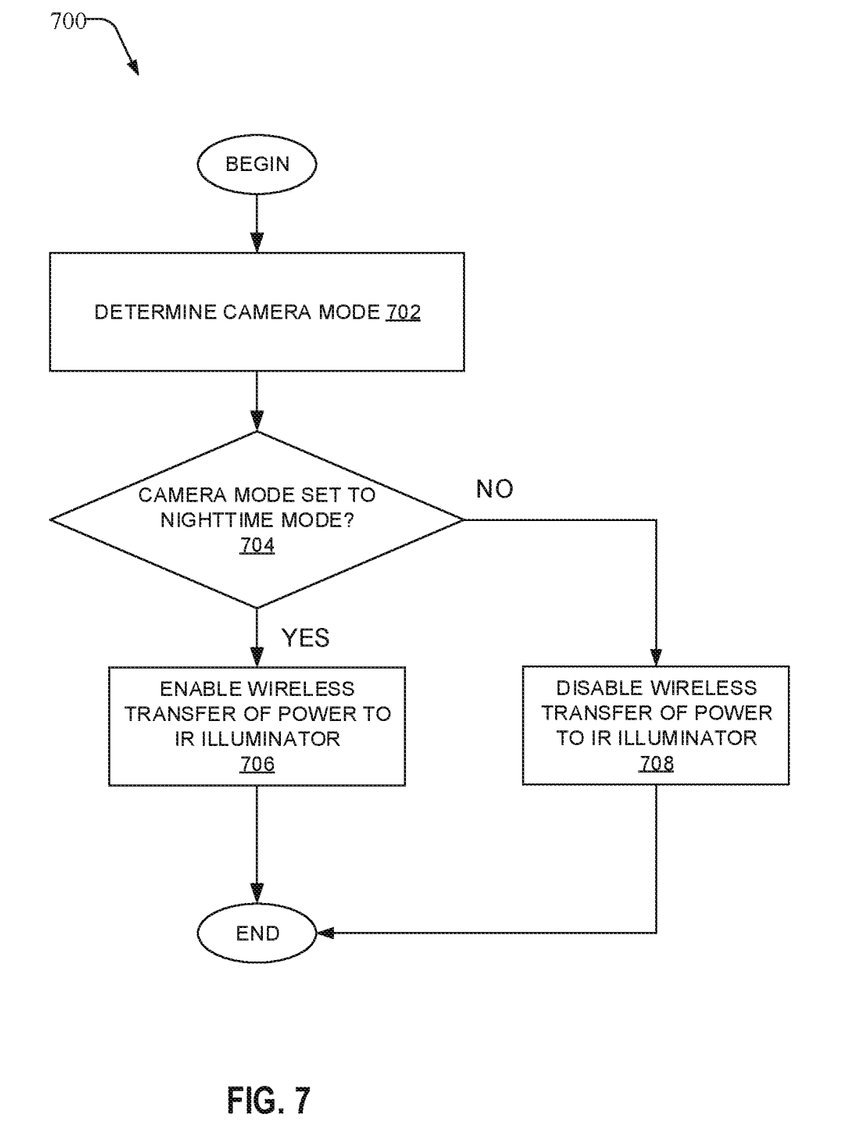
FIG. 7 is a flow diagram illustrating an example embodiment of a method for wireless power transfer of an infrared illuminator of a camera.

FIG. 7 is a flow diagram illustrating an example embodiment of a method 700 for wireless power transfer of an infrared illuminator 110 of a camera 102. At operation 702, a camera mode (e.g., night time operation or day time operation) is determined. In one example embodiment, operation 702 is implemented with the IR mode module 404 at the camera 102 or with the IR mode module 504 at the IR illuminator 110.

At operation 704, a determination is performed to determine whether the camera mode is set to night time mode. In one example embodiment, operation 704 is implemented with the IR mode module 404 at the camera 102 or with the IR mode module 504 at the IR illuminator 110.

If the camera mode is set to day time mode, the wireless transfer of power to the IR illuminator 110 is disabled at operation 706. In one example embodiment, operation 708 is implemented with the wireless power controller 408 and the switch 410 at the camera 102. In another example embodiment, operation 708 is implemented with the wireless power controller 508 and the switch 510 at the IR illuminator 110.

If the camera mode is set to night time mode, the wireless transfer of power to the IR illuminator 110 is enabled at operation 706. In one example embodiment, operation 708 is implemented with the wireless power controller 408 and the switch 410 at the camera 102. In another example embodiment, operation 706 is implemented with the wireless power controller 508 and the switch 510 at the IR illuminator 110.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via the network 602 and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by the computer network 602.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

A computing system can include clients and servers 604. A client and server 604 are generally remote from each other and typically interact through the computer network 602. The relationship of client and server 604 arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 8:
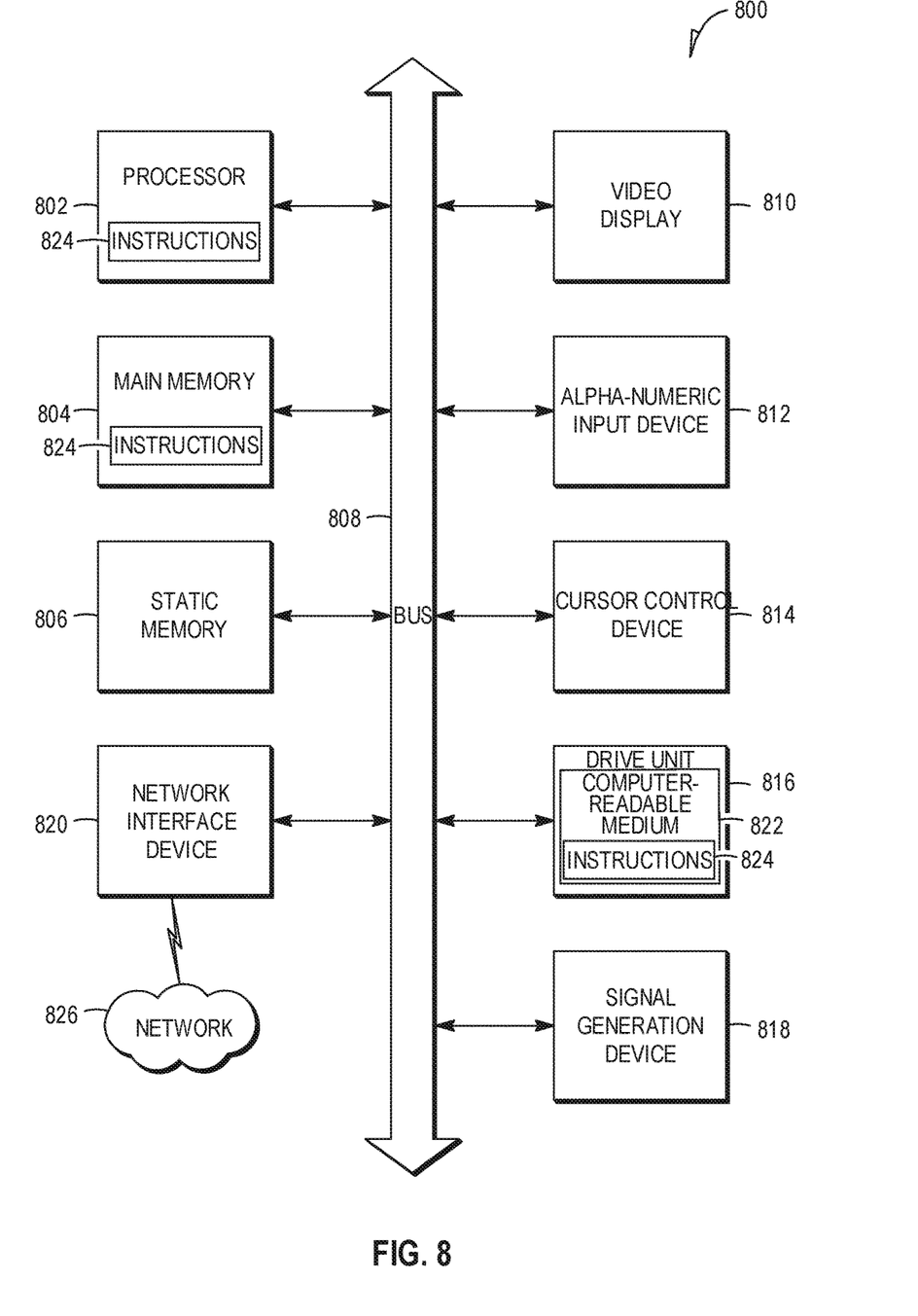
FIG. 8 shows a diagrammatic representation of machine in the example form of a computer system within which a set of instructions may be executed to cause the machine to perform any one or more of the methodologies discussed herein.

FIG. 8 is a block diagram of a machine in the example form of a computer system 800 within which instructions 824 for causing the machine to perform any one or more of the methodologies discussed herein may be executed. In alternative embodiments, the machine operates as a stand-alone device or may be connected (e.g., networked) to other machines. In a networked deployment, the machine may operate in the capacity of a server 504 or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch or bridge, or any machine capable of executing instructions 824 (sequential or otherwise) that specify actions to be taken by that machine. Further, while only a single machine is illustrated, the term "machine" shall also be taken to include any collection of machines that individually or jointly execute a set (or multiple sets) of instructions 824 to perform any one or more of the methodologies discussed herein.

The example computer system 800 includes a processor 802 (e.g., a central processing unit (CPU), a graphics processing unit (GPU) or both), a main memory 804 and a static memory 806, which communicate with each other via a bus 808. The computer system 800 may further include a video display unit 810 (e.g., a liquid crystal display (LCD) or a cathode ray tube (CRT)). The computer system 800 also includes an alphanumeric input device 812 (e.g., a keyboard), a user interface (UI) navigation (or cursor control)

device 814 (e.g., a mouse), a disk drive unit 816, a signal generation device 818 (e.g., a speaker) and a network interface device 820.

The disk drive unit 816 includes a computer-readable medium 822 on which is stored one or more sets of data structures and instructions 824 (e.g., software) embodying or utilized by any one or more of the methodologies or functions described herein. The instructions 824 may also reside, completely or at least partially, within the main memory 804 and/or within the processor 802 during execution thereof by the computer system 800, the main memory 804 and the processor 802 also constituting computer-readable media 822. The instructions 824 may also reside, completely or at least partially, within the static memory 806.

While the computer-readable medium 822 is shown, in an example embodiment, to be a single medium, the term "machine-readable medium" may include a single medium or multiple media (e.g., a centralized or distributed database, and/or associated caches and servers 504) that store the one or more instructions 824 or data structures. The term "computer-readable medium" shall also be taken to include any tangible medium that is capable of storing, encoding or carrying instructions 824 for execution by the machine and that cause the machine to perform any one or more of the methodologies of the present embodiments, or that is capable of storing, encoding or carrying data structures utilized by or associated with such instructions 824. The term "computer-readable medium" shall accordingly be taken to include, but not be limited to, solid-state memories, and optical and magnetic media. Specific examples of computer-readable media 822 include non-volatile memory, including by way of example semiconductor memory devices (e.g., erasable programmable read-only memory (EPROM), electrically erasable programmable read-only memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

The instructions 824 may further be transmitted or received over a communications network 826 using a transmission medium. The instructions 824 may be transmitted using the network interface device 820 and any one of a number of well-known transfer protocols (e.g., HTTP). Examples of communication networks 826 include a LAN, a WAN, the Internet, mobile telephone networks, POTS networks, and wireless data networks (e.g., Wi-Fi and WiMAX networks). The term "transmission medium" shall be taken to include any intangible medium capable of storing, encoding, or carrying instructions 824 for execution by the machine, and includes digital or analog communications signals or other intangible media to facilitate communication of such software.

Although an embodiment has been described with reference to specific example embodiments, it will be evident that various modifications and changes may be made to these embodiments without departing from the scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A system comprising:
a power source;
at least one camera coupled to the power source;
a wireless power transmitter coupled to the camera, the wireless power transmitter being configured to wirelessly transmit power from the power source, the camera comprising a wireless power controller configured to control the wireless power transmitter;
a wireless power receiver configured to receive power from the wireless power transmitter; and
an infrared illuminator coupled to the wireless power receiver, the infrared illuminator being powered by the wireless power receiver and being configured to generate infrared light.

2. The camera system of claim 1, wherein the camera further comprises:
one or more hardware processors configured to operate the camera in an infrared mode; and
a communication interface configured to communicate with a server.

3. The camera system of claim 2, wherein the camera, is configured to receive a communication from the server via the communication interface, the communication indicating an infrared mode setting of the camera, the infrared mode setting identifying a night time setting,
wherein the wireless power controller is configured to enable the wireless power transmitter to wirelessly transmit power to the wireless power receiver in response to identifying the night time setting.

4. The camera system of claim 3, wherein the camera further comprises:
a switch coupled between the wireless power transmitter and the power source, the switch being controlled by the wireless power controller,
wherein enabling the wireless power transmitter further comprises triggering the switch to connect the wireless power transmitter to the power source.

5. The camera system of claim 2, wherein the camera is configured to receive a communication from the server via the communication interface, the communication indicating an infrared mode setting of the camera, the infrared mode setting identifying a day time setting,
wherein the wireless power controller is configured to disable the wireless power transmitter in response to identifying the day time setting.

6. The camera system of claim 5, wherein the camera further comprises:
a switch coupled between the wireless power transmitter and the power source, the switch being controlled by the wireless power controller,
wherein disabling the wireless power transmitter further comprises triggering the switch to disconnect the wireless power transmitter from the power source.

7. The camera system of claim 1, wherein the infrared illuminator further comprises:
a battery coupled to the wireless power receiver; and
a wireless communication interface configured to receive a communication from the camera, the communication indicating an infrared mode setting of the camera,
wherein the infrared illuminator is configured to generate the infrared light in response to identifying the infrared mode setting.

8. The camera system of claim 1, wherein the infrared illuminator further comprises:
a battery coupled to the wireless power receiver; and
one or more hardware processors comprising an infrared mode module, the infrared mode module indicating an infrared mode setting,
wherein the infrared illuminator is configured to generate the infrared light based on the infrared mode setting.

9. The camera system of claim 1, wherein the camera and the wireless power transmitter are both disposed adjacent to a first side of a glass medium, wherein the wireless power receiver and the infrared illuminator are both disposed on a second opposite side of the glass medium, the first side being opposite to the second side.

10. The camera system of claim 1, wherein the camera and the infrared illuminator are aimed in a common direction.

11. A method comprising:
wirelessly transmitting power from a wireless power transmitter of a camera that is powered by a power source the camera comprising a wireless power controller configured to control the wireless power transmitter;
receiving the power from the wireless power transmitter at a wireless power receiver of an infrared illuminator; and
generating infrared light with the infrared illuminator.

12. The method of claim 11, further comprising:
communicating with a server; and
determining an infrared mode setting based on a communication with the server; and
controlling the wireless power transmitter based on the infrared mode setting.

13. The method of claim 12, further comprising:
identifying a night time setting; and
enabling the wireless power transmitter to wirelessly transmit power to the wireless power receiver in response to identifying the night time setting.

14. The method of claim 13, wherein the camera further comprises a switch coupled between the wireless power transmitter and the power source, the switch being controlled by the wireless power controller, and further comprising:
enabling the wireless power transmitter by turning on the switch and connecting the wireless power transmitter to the power source.

15. The method of claim 12, wherein the infrared mode identifies a day time setting, and further comprising disabling the wireless power transmitter in response to identifying the day time setting.

16. The method of claim 15, wherein disabling the wireless power transmitter further comprises turning off a switch that disconnects the wireless power transmitter from the power source.

17. The method of claim 11, further comprising:
connecting the wireless power receiver to a battery;
receiving a communication from the camera, at the infrared illuminator, the communication indicating an infrared mode setting of the camera; and
generating the infrared light in response to identifying the infrared mode setting.

18. The method of claim 11, further comprising:
connecting the wireless power receiver to a battery;
identifying an infrared mode setting at the infrared illuminator; and
generating the infrared light in response to identifying the infrared mode setting.

19. The method of claim 11, wherein the camera and the wireless power transmitter are both disposed adjacent to a first side of a glass medium, wherein the wireless power receiver and the infrared illuminator are both disposed on a second side opposite of the glass medium, the first side being opposite to the second side,
wherein the camera and the infrared illuminator are aimed at a common space.

20. A non-transitory computer-readable storage medium storing a set of instructions that, when executed by a processor, cause the processor to perform operations, comprising:
communicating with a server;
determining an infrared mode setting of a camera based on a communication with the server; and
causing a wireless power transmitter of the camera that is powered by a power source to wirelessly transmit power to a wireless power receiver of an infrared illuminator.

* * * * *

UNITED STATES PATENT AND TRADEMARK OFFICE
CERTIFICATE OF CORRECTION

PATENT NO. : 10,284,765 B1
APPLICATION NO. : 15/827811
DATED : May 7, 2019
INVENTOR(S) : Bunker et al.

Page 1 of 1

It is certified that error appears in the above-identified patent and that said Letters Patent is hereby corrected as shown below:

On the Title Page

Item (22) in "Filed", in Column 1, Line 1, after "2017", insert --¶(65) Prior Publication Data US2019/0166300 A1 May 30, 2019--

In the Claims

In Column 10, Line 59, in Claim 3, delete "camera," and insert --camera-- therefor In Column 11, Line 54, in Claim 11, after "source", insert --,--

Signed and Sealed this
Twenty-ninth Day of December, 2020

Andrei Iancu
*Director of the United States Patent and Trademark Office*